(12) United States Patent
Meyer (10) Patent No.: US 11,519,553 B2
(45) Date of Patent: Dec. 6, 2022

(54) MOVABLE GUARD (71) Applicant: Gebr. Schmidt Fabrik für Feinmechanik GmbH & Co. KG, St. Georgen (DE)

(72) Inventor: Andreas Leo Meyer, Furtwangen (DE)

(73) Assignee: GEBR. SCHMIDT FABRIK FÜR FEINMECHANIK GMBH & CO. K, St. Georgen (DE)

(*) Notice: Subject to any disclaimer, the term of this patent is extended or adjusted under 35 U.S.C. 154(b) by 407 days.

(21) Appl. No.: 16/751,746

(22) Filed: Jan. 24, 2020

(65) Prior Publication Data
US 2020/0158283 A1    May 21, 2020

Related U.S. Application Data (63) Continuation of application No. PCT/EP2018/069682, filed on Jul. 19, 2018.

(30) Foreign Application Priority Data

Jul. 27, 2017 (DE) ..................... 10 2017 116 990.3

(51) Int. Cl.
F16P 3/04 (2006.01)
B23Q 11/08 (2006.01)

(52) U.S. Cl.
CPC ............... F16P 3/04 (2013.01); B23Q 11/08 (2013.01)

(58) Field of Classification Search
CPC .................................. F16P 3/04; B23Q 11/08
USPC ..................................................... 192/129 R
See application file for complete search history.

(56) References Cited

U.S. PATENT DOCUMENTS

| 5,427,619 | A  |   | 6/1995 | Ehinger et al. |
| 8,671,622 | B2 |   | 3/2014 | Thomas |
| 9,541,234 | B2 | * | 1/2017 | Chang .................. F16P 1/00 |
| 2013/0193777 | A1 | * | 8/2013 | Sommerhalter, Jr. ...................... H02K 41/031 310/12.24 |
| 2015/0050096 | A1 | * | 2/2015 | Sato .................. B23Q 11/0891 409/134 |
| 2016/0178432 | A1 | * | 6/2016 | Masakawa ............ G01J 1/0403 250/216 |

FOREIGN PATENT DOCUMENTS

| DE | 2522282 A1 | 12/1976 |
| DE | 2825603 A1 | 12/1979 |

(Continued)

OTHER PUBLICATIONS

English translation of the International Preliminary Report on Patentability issued for the application PCT/EP2018/069682 dated Jan. 28, 2020; 7 pages.

(Continued)

Primary Examiner — Kerri L McNally
(74) Attorney, Agent, or Firm — Reising Ethington, P.C.

(57) ABSTRACT

A movable guard for safeguarding a machine, comprising: a protective cover for covering a working area of the machine; a counterweight; a connecting element for connecting the protective cover to the counterweight; a deflection element, which is configured to deflect the connecting element in such a way that the protective cover and the counterweight are movable in mutually opposite directions; and a drive, which acts on the counterweight in order to drive the counterweight.

19 Claims, 10 Drawing Sheets (56) References Cited

FOREIGN PATENT DOCUMENTS

| | | |
|---|---|---|
| DE | 69403485 T2 * | 2/1998 |
| DE | 69403485 T2 | 2/1998 |
| DE | 20021206 U1 | 4/2001 |
| DE | 10333416 B3 | 10/2004 |
| EP | 2460966 A2 | 6/2012 |
| GB | 583762 | 12/1946 |
| GB | 596055 | 12/1947 |
| JP | 04294997 B2 | 10/1992 |
| JP | 11300421 | 11/1999 |

OTHER PUBLICATIONS

International Search Report issued for the application PCT/EP2018/069682 dated Nov. 27, 2018.
Examination Report issued by the European Patent Office for EP18743778.5 dated Nov. 5, 2021; 6 pages.

* cited by examiner

MOVABLE GUARD

CROSS REFERENCE TO RELATED APPLICATIONS

This application is a continuation of international patent application PCT/EP2018/069682, filed on Jul. 19, 2018 designating the U.S., which international patent application has been published in German language and claims priority from German patent application DE 10 2017 116 990.3, filed on Jul. 27, 2017. The entire contents of these priority applications are incorporated herein by reference.

BACKGROUND OF THE INVENTION

This disclosure relates to a movable guard for safeguarding a potentially dangerous machine, in particular for safeguarding a press. The disclosure furthermore relates to a press comprising a movable guard of this kind.

It is customary to safeguard potentially dangerous machines, e.g. a press, a lathe, milling machine and/or drilling machine, a grinding machine etc. with the aid of "guards" in accordance with international standard DIN EN ISO 14120. Guards of this kind generally have a protective cover, which prevents uncontrolled access to the dangerous working area from the outside. In the present case, the term "protective cover" should be interpreted in a general way and broadly includes any type of physical barrier, such as, for example, a housing, a shield, a hood, a door, a wall or some other cladding element.

However, controlled access to the working area of the machine is often required, e.g. in order to clamp a new workpiece into the machine for machining, to set up a machining process or to rectify faults. Accordingly, many of these guards are configured as movable guards, which allow access to the working area of the machine by moving or opening the protective cover. In this case, the protective cover is generally provided with one or more safety switches, which generate an enable signal for the working mode of the machine only when the protective cover is closed. While the protective cover is open, it is not possible to put the machine into operation, and therefore hazard-free access to the machine is ensured.

As an alternative to guards with physical barriers, protective devices with a contactless action, e.g. photoelectric barriers or light arrays, are also often used. However, different safety clearances between the protective device and the danger point in the machine must be maintained in this context, depending on the machine to be safeguarded. The higher the speed of the danger point in the machine, the greater must be the safety clearance selected. This can lead to a non-ergonomic working situation since the machining location, which must be manually accessible, may be a very long way from the protective device under certain circumstances. Another disadvantage of such protective devices with a contactless action is the lack of protection from process-related splintering involving chips, projectiles or other waste products.

For space-saving arrangements, guards are therefore generally preferred over the protective devices with a contactless action. In the case of moving (power-operated) guards, one of the challenges lies, in particular, in the choice of a drive for moving the protective cover.

SUMMARY OF THE INVENTION

It is an object to provide a guard with a movable protective cover, wherein the drive for moving the protective cover is configured to be as space-saving as possible and can be operated in an energy-efficient manner.

According to a first aspect, a movable guard is provided which comprises the following features: (i) a protective cover which is configured to cover a working area of the machine; (ii) a counterweight; (iii) a connecting element which connects the protective cover to the counterweight; (iv) a deflection element, which is configured to deflect the connecting element in such a way that the protective cover and the counterweight are movable in mutually opposite directions; and (v) a drive, which acts on the counterweight in order to drive the counterweight.

According to a second aspect, a press is presented which a movable guard, wherein said movable guard comprises: (i) a protective cover which is configured to cover a working area of the machine; (ii) a counterweight; (iii) a connecting element which connects the protective cover to the counterweight; (iv) a deflection element, which is configured to deflect the connecting element in such a way that the protective cover and the counterweight are movable in mutually opposite directions; and (v) a drive, which acts on the counterweight in order to drive the counterweight.

A feature of the herein presented guard is the fact that the protective cover is moved not only with the aid of a drive but also with additional support from a counterweight that can move in the opposite direction. The counterweight is connected to the protective cover with the aid of a connecting element. The connecting element is deflected in terms of the direction thereof by one or more deflection elements. This gives rise to coupling between the movement of the protective cover and the counterweight, in accordance with which the protective cover and the counterweight are movable parallel to one and the same movement axis but in mutually opposite directions.

The movement axis is preferably aligned in the vertical direction. In this way, optimum use is made of the action of the counterweight, and the force exerted in moving the protective cover is minimized.

Another feature of the herein presented guard may be considered to be the fact that the drive engages on the counterweight and not, as otherwise conventional in such drives, directly on the protective cover. Thus, the counterweight is not used only as a pure counterweight but also acts as a force input element and thus as part of the drive train for driving the protective cover. The drive can therefore be arranged relatively far away and at a more or less arbitrary location. By virtue of this possibility of variable arrangement of the drive, the total space requirement of the guard can be reduced.

The guard thus allows a relatively compact construction while simultaneously achieving an energy-efficient drive concept for moving the movable protective cover.

A wide variety of components, e.g. a cable, a chain, a toothed belt, a spindle etc., can be used as a connecting element for connecting the protective cover to the counterweight. As a deflection element in the herein presented sense, it is possible to use a deflection pulley, a gearwheel, a shaft or a mechanism, for example.

According to a refinement, the connecting element comprises a cable, the ends of which are connected to each other, wherein the deflection element comprises two deflection pulleys.

The two deflection pulleys, together with the cable, form a cable control with a (360°-) circulating cable. The two deflection pulleys are preferably arranged parallel to each other and spaced apart from each other.

Both deflection pulleys are designed as fixed pulleys. The position of fixed pulleys in a cable control does not change during use. Nevertheless, the position of at least one of the pulleys can preferably be changed to tension the cable (before or after use).

In the present use, a cable control of this kind with two fixed pulleys and a circulating cable, the ends of which are connected to each other, has the advantage that the counterweight can be moved actively by the drive in both directions to open and close the protective cover. Since the cable control forms a closed circuit, tension forces can be transmitted via the cable in the two opposite directions along the cable, both for opening and for closing the protective cover.

According to another refinement, the connecting element comprises a first cable, the ends of which are connected to each other, and a second cable, the ends of which are connected to each other, wherein the deflection element comprises two first deflection pulleys for deflecting the first cable and two second deflection pulleys for deflecting the second cable, and wherein the first cable and the second cable are spaced apart, run parallel to each other and are each connected separately to the counterweight and the protective cover.

In a manner similar to the abovementioned refinement, each of the two cables with in each case two deflection pulleys forms a cable control with a circulating cable. Here too, the deflection pulleys are preferably all configured as fixed pulleys.

In a further refinement, four deflection pulleys per cable control are provided instead of two deflection pulleys per cable control. In this case, the cable is not deflected by 180° at each deflection pulley but by 90°. This offers the possibility inter alia of positioning the counterweight and the protective cover even further apart and accordingly providing space for the drive.

The use of two separate cable controls, which engage separately from one another on the counterweight and the protective cover, offers several advantages: on the one hand, this creates redundancy. Thus, the snapping of a cable does not lead to the protective cover falling without braking and possibly injuring the operator of the system. On the other hand, the force can be better distributed. Another advantage is that jamming of the protective cover generally occurs if one cable snaps since the protective cover tilts owing to the separate, mutually spaced arrangement of the two cables. This serves as a clear indication to the operator that there is a malfunction and that it may be necessary to replace a cable. The risk that the snapping of a cable remains unnoticed by the operator and, as a consequence, the second cable may also snap is thereby minimized.

According to a further refinement, the movable guard furthermore comprises two mutually spaced linear guides, which are arranged parallel to each other and in which the protective cover is guided.

This allows stable and low-friction guidance. Transverse forces, which cannot be absorbed by the connecting element in the case where the connecting element is configured as a cable, are compensated by the linear guides. A very wide variety of types of linear guide with rolling elements or sliding bearings can be used for this purpose.

According to a further refinement, the first cable and the second cable are the same distance from a central plane, which divides the protective cover into two halves of equal size. The two linear guides arranged parallel to each other are preferably also at the same distance from this central plane.

Optimum force distribution can be achieved through the symmetrical arrangement of the two cable controls. During normal operation, the risk of jamming of the protective cover within the linear guide is very largely minimized.

According to a further refinement, the drive engages on the counterweight at a force input point which is at the same distance from the first and the second cable and/or is at the same distance from the two linear guides.

The driving force is therefore introduced centrally into the counterweight. Thus, the driving force introduced is introduced symmetrically into the two cables, thereby ensuring that said cables are subject to equal loads.

According to a further refinement, the drive is connected to the counterweight by means of a magnetic coupling.

This magnetic coupling serves as a safety function to minimize the risk to the operator when closing the protective cover. When closing the protective cover, the protective cover is preferably moved vertically downward. The counterweight is pulled vertically upward in the opposite direction by the drive. During this process, the magnetic coupling between the counterweight and the drive is subjected to tension. If the closing movement of the protective cover is blocked, e.g. by an obstacle, the magnetic coupling separates. The protective cover is thus separated from the drive.

The magnetic coupling preferably comprises a permanent magnet. Through suitable selection (material, size and/or shape) of the permanent magnet, the separation force of the coupling at which the protective cover is separated from the drive can be predefined.

According to a further refinement, the permanent magnet is mounted in a floating manner.

This ensures that the drive engages flat on the permanent magnet in order, on the one hand, to avoid tilting within the system and, on the other hand, to transmit the separation force as precisely as possible. The permanent magnet is preferably mounted in a floating manner with the aid of an O-ring.

According to a further refinement, the drive comprises a linear drive. Very many different types of linear drive may be considered for this use, e.g. a recirculating ball screw, a recirculating roller screw, a hydraulic or pneumatic cylinder, a spindle drive or a linear motor.

In a further refinement, a linear motor is used as the linear drive, wherein the linear motor comprises a Hall-effect sensor. The integrated Hall-effect sensor has the advantage that it can act as a measuring sensor, thereby enabling the deflection of the slider of the linear motor and hence also the position of the protective cover to be measured very precisely.

In a further refinement, the linear drive comprises a slider which is moved in a translatory manner, wherein the slider and the counterweight together have a total dead weight which differs by no more than 10% from a dead weight of the protective cover. The dead weight of the slider and of the counterweight is preferably chosen in such a way that, in total, they are exactly as heavy as the protective cover.

This has the advantage that the force exerted in driving the protective cover is minimized. When there is an equilibrium of forces between the weights of the slider/counterweight and the protective cover, the drive merely has to produce force for the acceleration or braking process. To maintain a uniform movement, all that is required is to compensate for the negligible frictional and bearing forces.

According to a further refinement, the protective cover comprises a transparent hood. The working area of the machine is therefore visible to the operator, even in the closed state of the protective cover.

In principle, the protective cover can be made from a safety glass. For reasons of weight, however, a protective cover made of plastic, preferably a polycarbonate such as Makrolon, is preferred.

In a further refinement, the protective cover comprises a substantially U-shaped cross section. The working area of the machine to be safeguarded is thus visible from several sides when the protective cover is closed and accessible from several sides when the protective cover is open.

It is self-evident that the features mentioned above and those which will be explained below can be used not only in the respectively indicated combination but also in other combinations or in isolation without exceeding the spirit and scope of the present disclosure.

DESCRIPTION OF PREFERRED EMBODIMENTS

Figure 1:
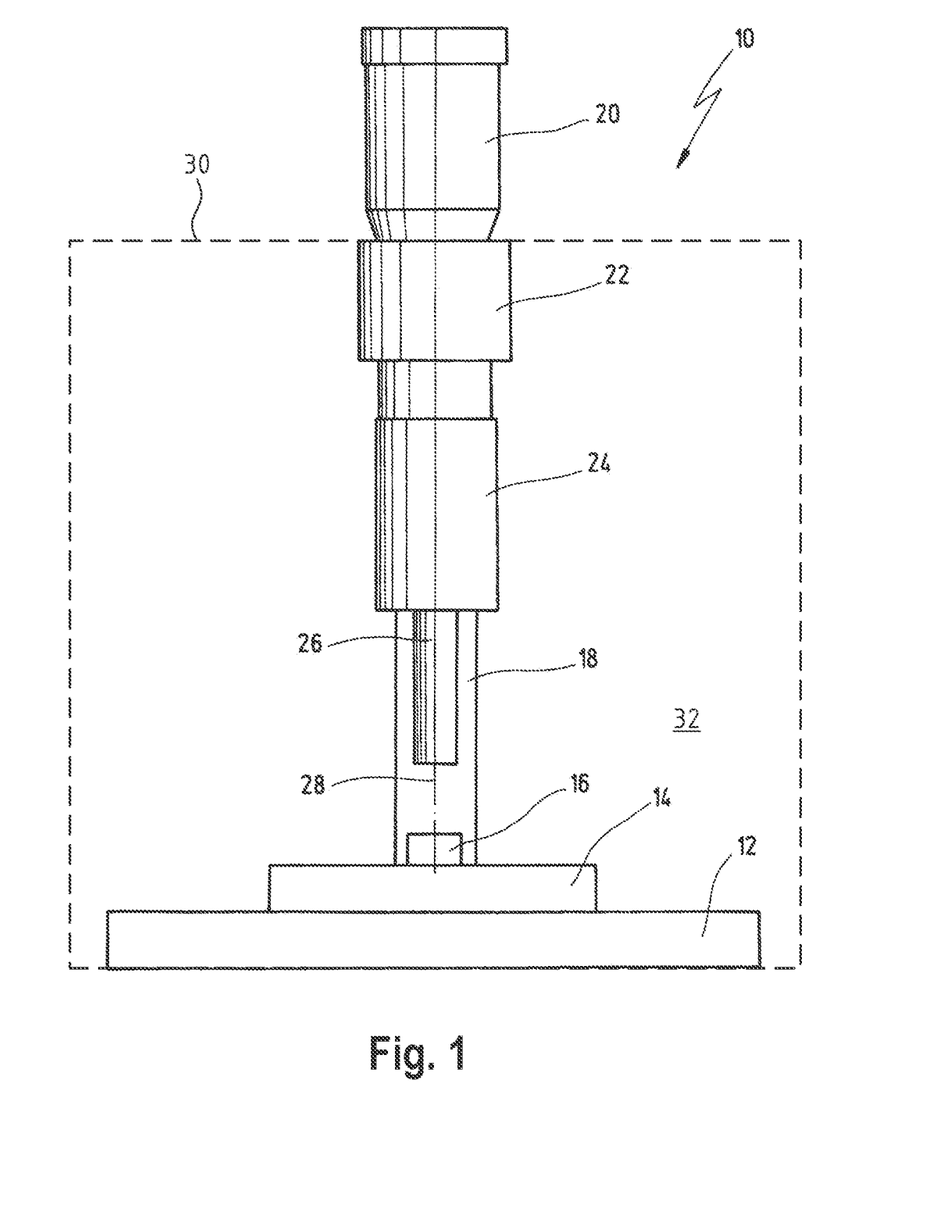
FIG. 1 shows a schematic illustration of an electric press comprising a movable guard according to an embodiment.

A press is shown schematically in FIG. 1 as an example of a machine which can be protected, in some instances, by a movable guard. In FIG. 1, the press is denoted in its entirety by reference numeral 10. For example, the press 10 can be an electric press which is used as a joining press. A press of this kind is described by way of example in German Patent DE 103 33 416 B3.

The press 10 comprises a base plate 12, on which a workpiece holder 14 with a workpiece 16 to be machined is situated. A column 18 projects upward from the base plate 12. At the upper end of the column 18 is an electric drive motor 20, below which is a torque converter 22, and below that is a spindle 24. Projecting downward from the spindle 24 is a press ram 26, which can be moved along a vertical axis 28 with the aid of the drive motor 20, the torque converter 22 and the spindle 24 in order to machine the workpiece 16.

Reference sign 30 denotes a movable guard indicated only schematically in FIG. 1, which guard is described as an exemplary embodiment by means of the following figures.

Figure 2:
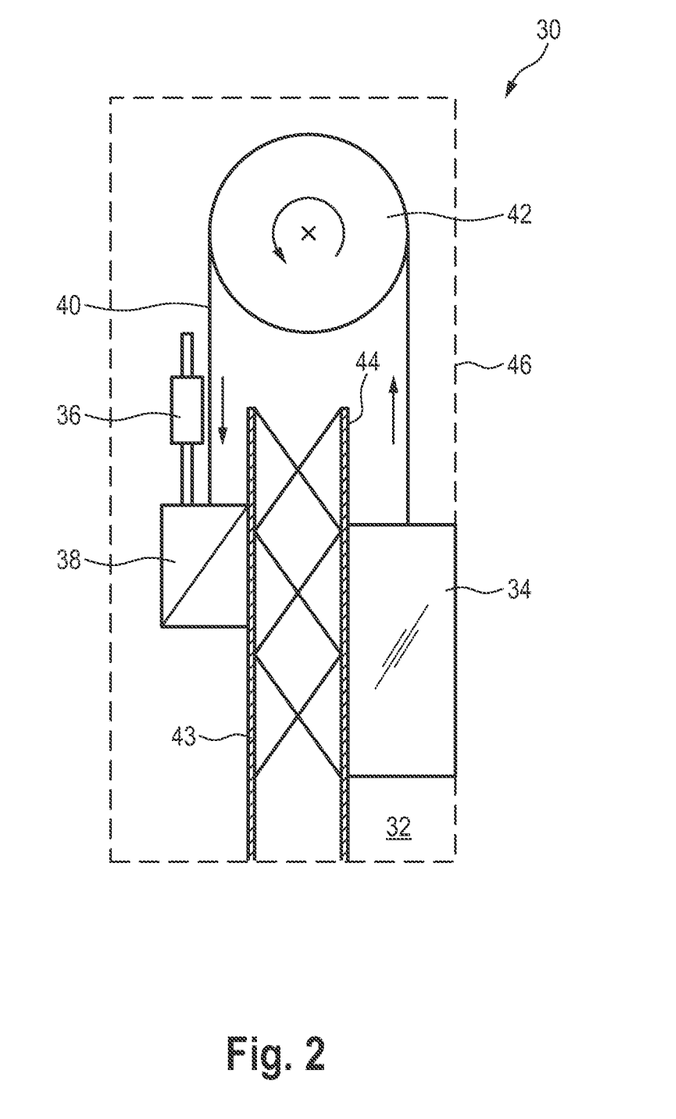
FIG. 2 shows a schematic diagram of the movable guard.

FIG. 2 shows a schematic diagram of the movable guard 30. The guard 30 is preferably a combination of a fixed guard and of a moving (power-operated) guard. The guard 30 serves to safeguard a working area 32 in order to prevent a person, e.g. the operator of the machine, from accessing the working area 32 during operation and sustaining injuries in the process.

The guard 30 comprises a protective cover 34 for covering at least part of the working area 32. This protective cover 34 is preferably configured as a hood but can also be configured as a door, plate, grille or some other cladding part. The protective cover 34 can be moved parallel to the vertical axis 28 in order to make the working area 32 either accessible or inaccessible from the outside.

The opening or closing movement of the protective cover 34 is brought about by a drive 36. This drive 36 is preferably configured as a linear drive. The drive 36 drives a counterweight 38, which is coupled to the protective cover 34 in terms of movement by means of a connecting element 40 and a deflection element 42. Thus, the drive 36 does not engage directly on the protective cover 34 but, instead, on the counterweight 38, which is moved counter to the protective cover 34.

According to a preferred embodiment, the connecting element 40 is configured as a cable, and the deflection element 42 is configured as a deflection pulley, and therefore the connecting element 40 and the deflection element 42 jointly form a cable control. Instead of a cable control, the two components 40, 42 can also be configured as a belt drive, chain hoist or the like, however. It is likewise also possible for more than just one connecting element 40 and one deflection element 42 to be provided.

Irrespective of the specific embodiment, coupling of the movement of the protective cover 34 with that of the counterweight 38 is implemented by means of the connecting element 40 and the deflection element 42 and, in accordance with this coupling, the protective cover 34 and the counterweight 38 are moved in opposite directions parallel to the vertical axis 28. If the counterweight 38 is moved vertically downward, the protective cover 34 is pulled vertically upward and vice versa.

To stabilize and guide the movement of the protective cover 34, the guard 30 furthermore preferably comprises a linear guide 44. This linear guide 44 preferably comprises at least one rolling bearing or sliding bearing. The counterweight 38 too can be guided on a corresponding guide 43.

Furthermore, the movable guard 30 comprises a plurality of fixed or immovable cladding components, which surround the working area 32 of the machine 10 to be safeguarded and, in FIG. 2, are indicated only in dashed lines and are denoted by the reference numeral 46.

Figure 3:
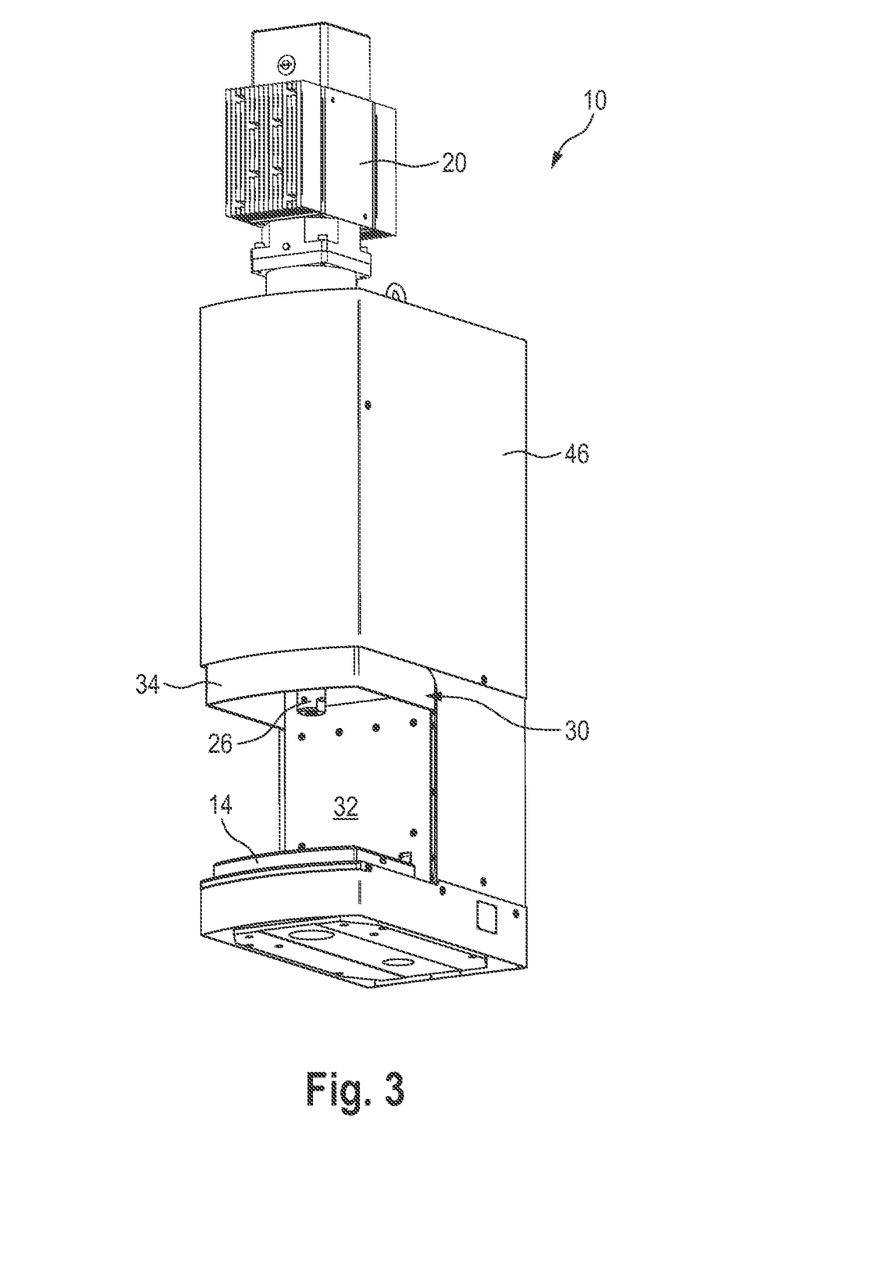
FIG. 3 shows a perspective view of an embodiment of the movable guard.

FIG. 3 shows an embodiment of an electric press 10 with the movable guard 30 in a perspective view. According to this embodiment, the protective cover 34 is configured as a U-shaped hood. Thus, it covers the working area 32 of the press 10 in three directions. In order to be able to see the working area 32, even when the protective cover 34 is closed, the protective cover 34 is preferably made from a transparent material. Plastic, in particular, is suitable for this purpose since plastic has a low weight in comparison with glass or other materials.

The protective cover 34 is preferably moved purely in translation. During opening, the protective cover 34 according to the embodiment shown in FIG. 3 moves into a housing consisting of fixed cladding components 46. During closing, the protective cover 34 moves out vertically downward in a correspondingly opposite direction until the lower end of the working area 32 has been reached and the workpiece holder 14 is completely surrounded.

In the embodiment shown, the protective cover 34 is guided on two vertically extending linear guides 50 with the aid of a plurality of sliding bearings 48. The two linear guides 50 extend parallel to each other and are arranged on opposite sides of the protective cover 34. In order to ensure the required stiffness of the sliding bearing assemblies 48, they are connected to one another on each side of the protective cover 34 with the aid of a respective connecting strip 52.

The protective cover 34 is driven by means of a servo motor, which, in the embodiment under consideration, is embodied as a linear motor 54 with a stator 56 and a slider 58. The slider 58 of the linear motor 54 engages on the counterweight 38. In this embodiment, two cables 60, 62 act as a connecting element 40 for the connection of the protective cover 34 to the counterweight 38. The two cables 60, 62 are arranged on opposite sides of the movable guard 30 and extend parallel to one another.

Both cables 60, 62 are circulating cables, which form a closed circuit. In the embodiment under consideration, each of the two cables 60, 62 is deflected via four deflection pulleys 64, 66 in each case. All eight deflection pulleys 64, 66 are fixed pulleys, which are not moved during operation. However, the two upper deflection pulleys 64, 66 of each cable control can be moved vertically in order to tension the cables 60, 62.

Figure 4:
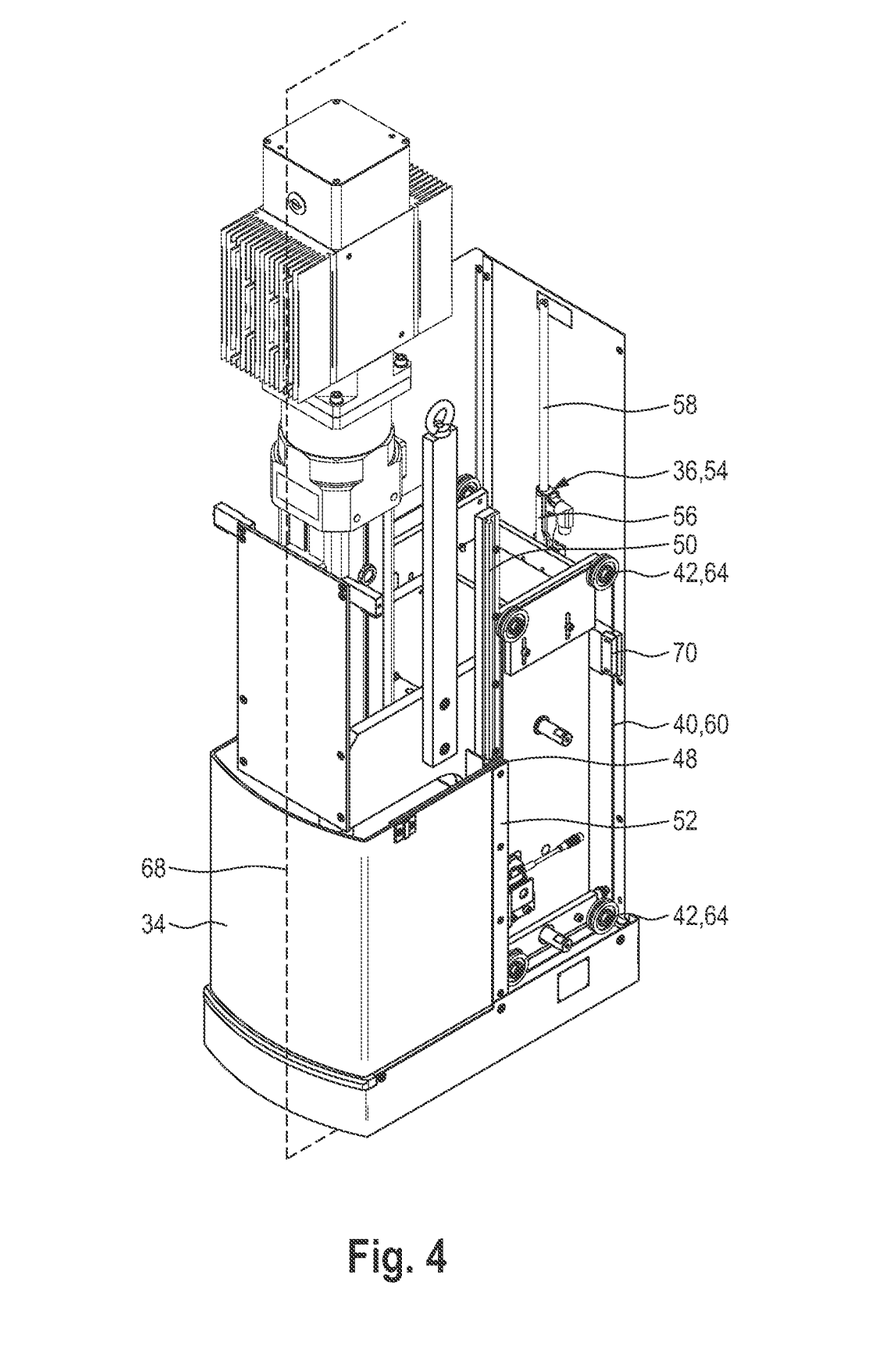
FIG. 4 shows a perspective view of the embodiment shown in FIG. 3 from a first side, wherein several side walls of the movable guard have been omitted.
Figure 5:
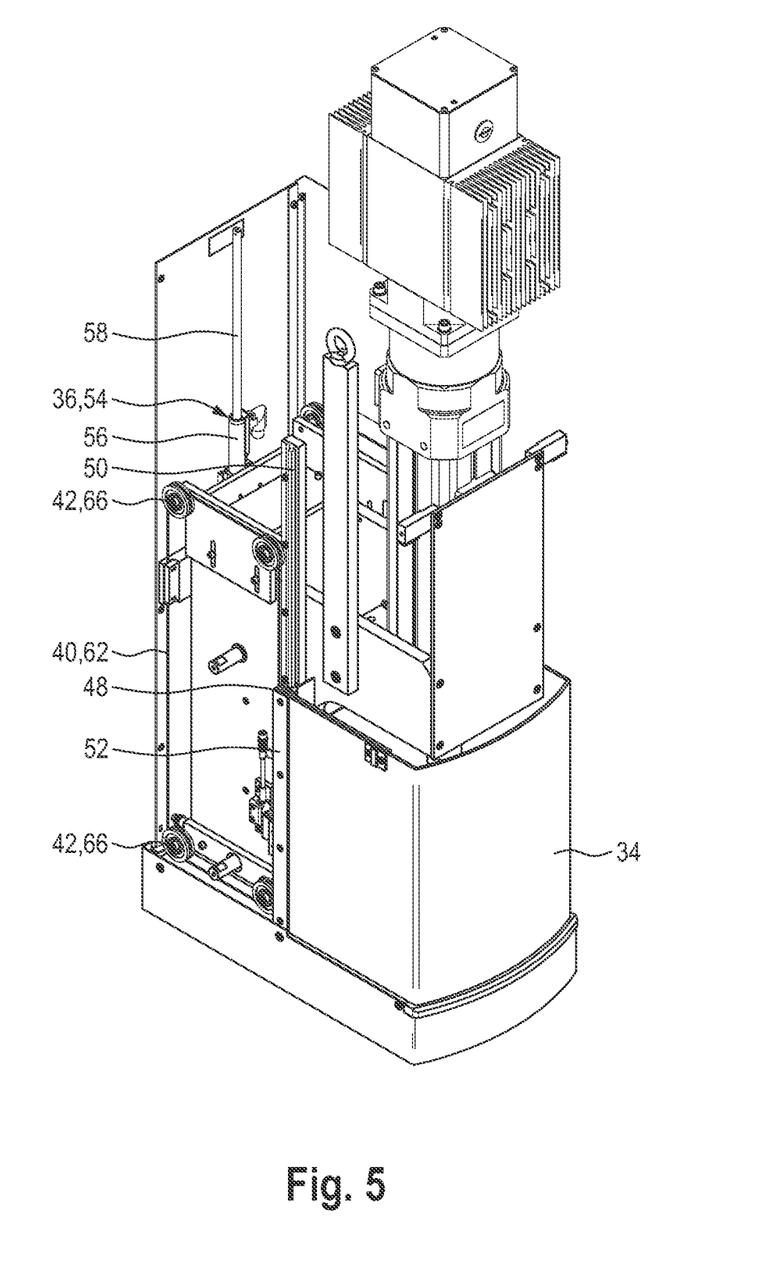
FIG. 5 shows a perspective view of the embodiment shown in FIG. 3 from an opposite second side, wherein several side walls of the movable guard have been omitted.
Figure 6:
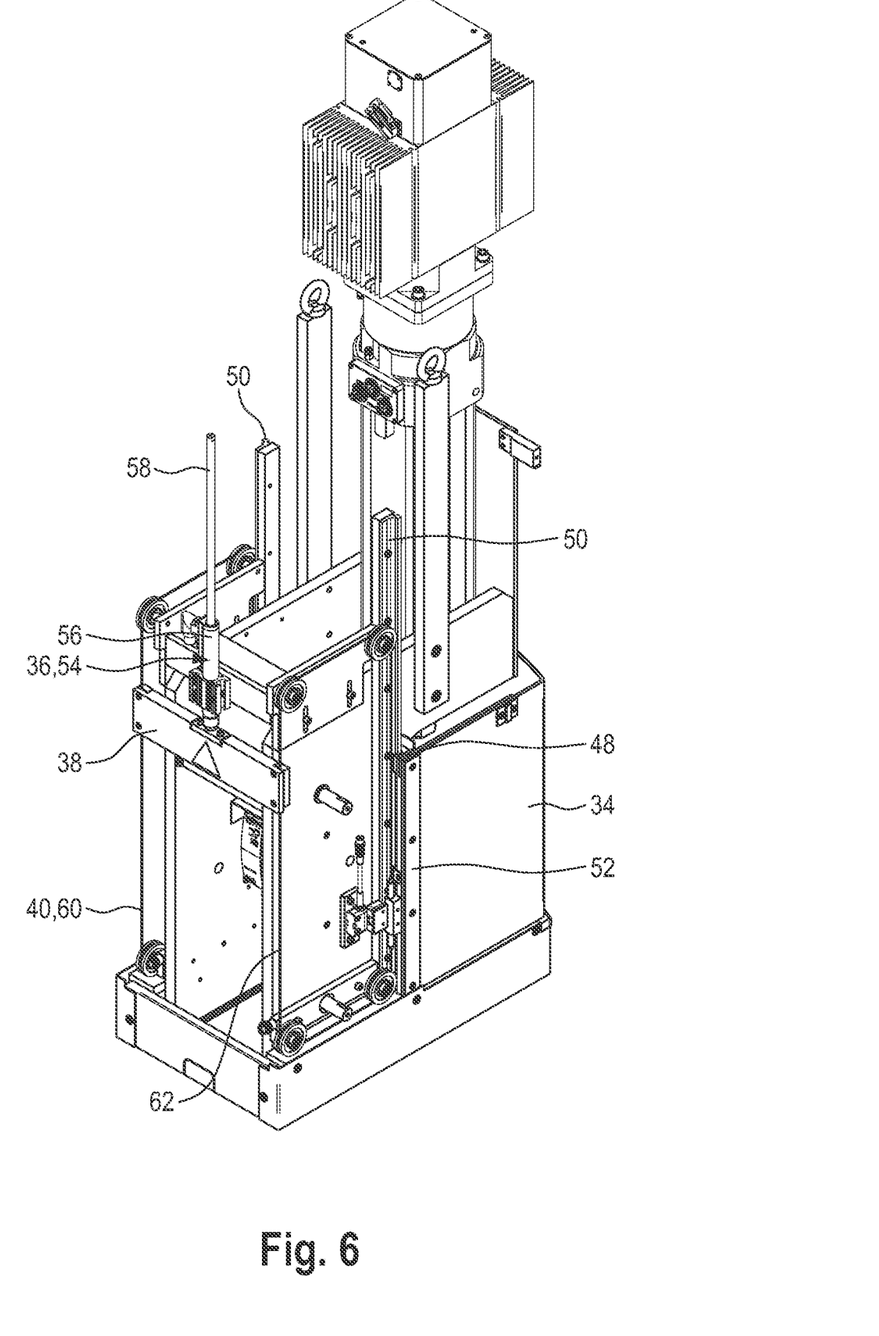
FIG. 6 shows a perspective view of the embodiment shown in FIG. 3 obliquely from the rear, wherein several side walls of the movable guard have been omitted.
Figure 7:
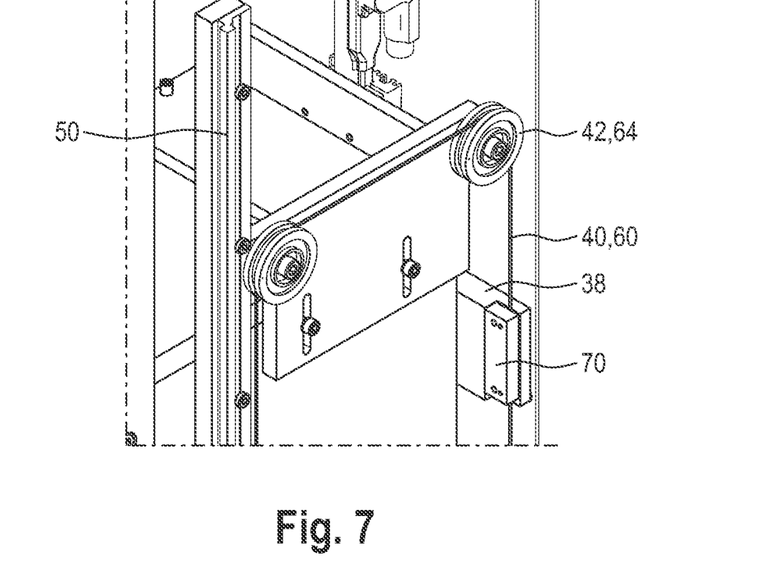
FIG. 7 shows a detail from FIG. 6.

In order to achieve symmetrical force distribution, each of the two cables 60, 62 is arranged at an equal distance from an imaginary central plane 68, which divides the protective cover 34 into two identical halves of equal size and extends parallel to the vertical direction 28. This central plane 68 is indicated in dashed lines in FIG. 4. The introduction of force by the linear motor 54 takes place centrally on the counterweight 38 in this central plane 68. Thus, the driving force introduced is introduced symmetrically into the two cables 60, 62. This, in turn, ensures uniform motion of the protective cover 34 without jamming.

Each of the two cables 60, 62 preferably comprises a stainless steel cable with a plastic jacket. The plastic jacket reduces the wear on the deflection pulleys 64, 66 to a minimum.

The two cables 60, 62 are each connected separately, i.e. independently of each other, to the counterweight 38, on the one hand, and to the protective cover 34, on the other hand. The connections are preferably implemented by means of straps 70 or quick-acting clamps 72.

The use of two cables 60, 62 prevents the protective cover 34 from dropping if one cable 60, 62 snaps. Moreover, the snapping of a cable 60, 62 has the effect that the opening or closing function of the protective cover can no longer be carried out since the protective cover 34 jams in the linear guides 50. However, this situation does not represent any risk for the operator since the operation of the machine or press 10 cannot be initiated while the protective cover 34 is open. Owing to the jamming of the protective cover 34, the operator can recognize that one of the two cables 60, 62 must have snapped and can ensure the replacement of said cable. The use of two cables 60, 62 thus serves not only for redundancy but also allows easy detection of a malfunction if one cable snaps.

The stator 56 of the linear drive 54 preferably comprises a plurality of coils and a Hall-effect sensor 74. The slider 58 of the linear drive 54 comprises a stainless steel tube and a multiplicity of permanent magnets, for example. If the coils of the stator 56 are activated with the aid of a converter, the slider 58 moves. The evaluation of the Hall-effect sensor 74 corresponds to a measuring system. The slider 58 can therefore be positioned very accurately.

The free length of the linear motor 54 or the length of the slider 58 corresponds to the opening stroke of the protective cover 34. The linear motor 54 is preferably installed parallel to the vertical axis 28. The slider 58 thus extends parallel to the linear guides 50. During operation, the slider 58 presses centrally on the counterweight 38. The counterweight 38 and the dead weight of the slider 58 preferably correspond in total to the weight of the protective cover 34. This has the effect that the protective cover 34 remains stationary, subject to no forces, at each position. When stationary, the linear motor 54 does not require any power in order to hold the protective cover 34 in its position. Electric energy is required only for acceleration and for the constant traveling speed. This results in a very energy-efficient drive system.

Owing to the opposite coupling of the movement of the protective cover 34 with that of the counterweight 38, these two components move in opposite directions to one another. To open the protective cover 34, the linear motor 54 moves the counterweight 38 downward. In order to close the protective cover 34, on the other hand, the linear motor 54 must move the counterweight 38 vertically upward.

Figure 9:
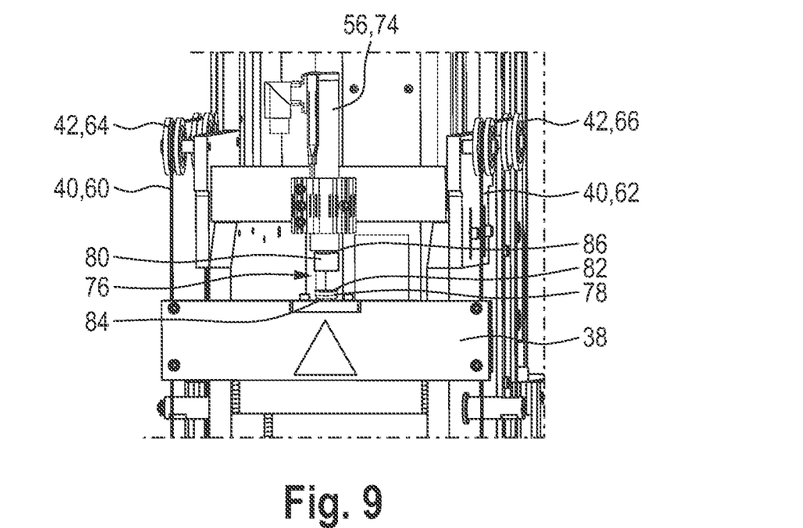
FIG. 9 shows another detail from FIG. 6 illustrated in plan view.
Figure 10:
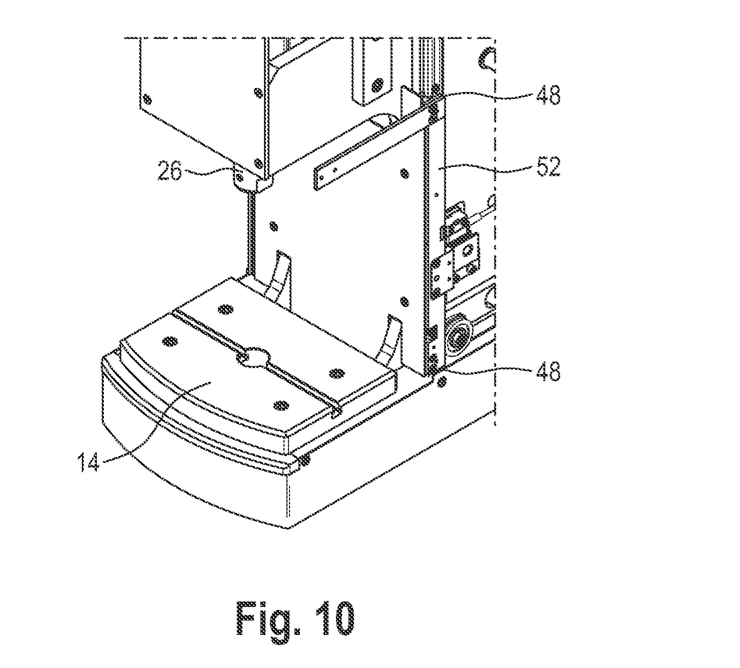
FIG. 10 shows a detail from FIG. 1 in a perspective view obliquely from above, wherein cladding parts of the movable guard have been omitted.

The linear motor 54 is preferably connected to the counterweight 38 by means of a magnetic coupling 76 (see FIG. 9). This magnetic coupling 76 comprises a permanent magnet 78, which is preferably arranged centrally on the counterweight 38. A driver 80 made from a ferromagnetic material is arranged on the end of the slider 58 as a counterpart to the permanent magnet 78.

During the closing of the protective cover 34, the magnetic coupling 76 is subject to tension. If the tensile force with which the counterweight 38 is pulled vertically upward exceeds the force of attraction between the permanent magnet 78 and the driver 80, the magnetic coupling 76 is separated. This serves as a safety function during the closing of the protective cover 34.

Since an unwanted intervention must be expected during the closing of the protective cover 34, body parts of the operator must be prevented from being trapped between the protective cover 34 and the workpiece holder 14, for example. In such a case, several safety functions can therefore be provided. On the one hand, the drive 36 or 54 can be set up to reduce the speed at which the protective cover 34 is closed by 50% compared with the opening speed thereof. The kinetic energy of the protective cover is thereby limited during closure. The motor current of the linear motor 54 can furthermore be monitored continuously during the closing movement of the protective cover 34. If a predetermined limit is exceeded, e.g. during an attempt to stop the protective cover 34 by hand, the linear motor 54 stops. The magnetic coupling 76 acts as a further safety function, preferably being configured in such a way that there is a separation between the permanent magnet 78 and the driver 80 when a predefined force is exceeded.

The separation force is preferably set by a suitable selection of the permanent magnet 78. An additional possibility for setting consists in arranging a spacer element 82, e.g. in the form of a spacer film, on the upper side of the permanent magnet 78. A defined magnetic air gap, which reduces the separation force, is thereby produced.

In order to ensure that the driver 80 arranged on the underside of the slider 58 rests flat on the permanent magnet 78 or flat on the spacer element 82, the permanent magnet 78 is preferably mounted in a floating manner with the aid of an O-ring 84.

The movement of the protective cover 34 is furthermore defined by travel limitation of the counterweight 38. For this purpose, a lower end stop 84 (see FIG. 8) and an upper end stop 86 (see FIG. 9) are preferably provided.

Figure 8:
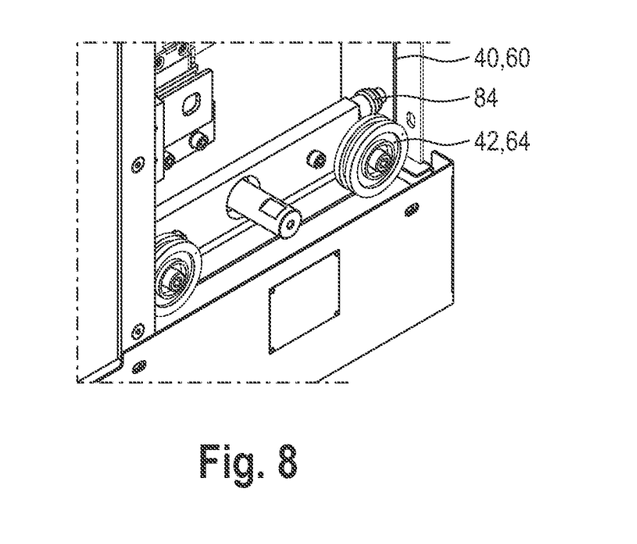
FIG. 8 shows another detail from FIG. 6.

The lower end stop 84 comprises two flexible rubber elements, for example, which are arranged on the frame of the movable guard 30. For example, these rubber elements can be arranged on both sides on the cross struts on which the lower deflection pulleys 64, 66 of the two cable controls are also arranged. By means of this lower stop 84, the upper (open) end position of the protective cover 34 is limited.

In contrast, the lower closed position of the protective cover 34 is limited by the upper end stop 86, which is preferably arranged on the driver 80 of the slider 58 of the linear motor 54. For example, an O-ring can be used as the upper end stop 86, which is supported against the stator 56 of the linear motor 54 in the end position. This upper end stop 86 also serves as a stop for the reference movement of the linear motor 54.

The linear motor 54 preferably comprises sliding guides, which extend parallel to the vertical axis 28. Since the cables 60, 62 have a sufficiently strong guiding property and, on the other hand, are to a certain extent flexible, alignment errors are automatically compensated. The sliding guides of the linear motor 54 are therefore subject to only minimal stresses. Nevertheless, the linear motor 54 preferably comprises adjusting elements, by means of which the point of action of force on the counterweight 38 can be aligned. These adjusting elements can have leveling screws, for example, which are arranged on the stator 56. Moreover, slotted holes can be provided in the stator. By means of these leveling screws and of the slotted holes, the stator 56 with the driver 80 can be set exactly in line with the guidance of the counterweight 38 over the entire range of the stroke of the counterweight 38.

FIGS. 11-14 show details of further safety systems for the movable guard 30. According to DIN EN ISO 14120, a power-operated, movable guard must be equipped with safety switches. For example, it must be ensured that the machine 10 to be safeguarded cannot be set in motion while the protective cover 34 is open. This is often also referred to as a starting function. Moreover, it must be ensured that the protective cover 34 cannot be opened during the operation of the machine 10 to be safeguarded.

Figure 11:
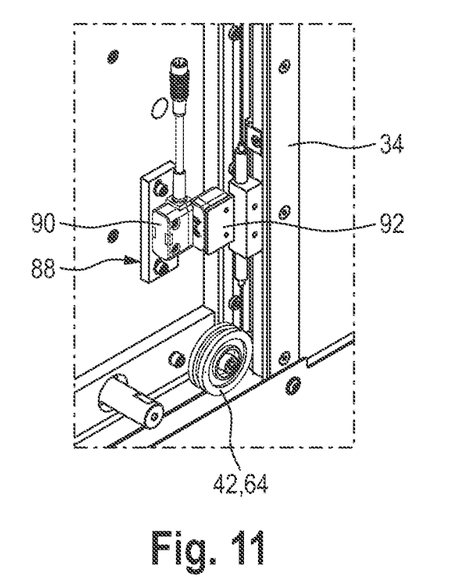
FIG. 11 shows a detail of a first locking device that can be used in the movable guard.

The guard 30 comprises a first safety switch 88 for the abovementioned purposes (see FIG. 11). This safety switch is based on contactless RFID technology. The first safety switch 88 comprises a first switching element 90 and a first actuator 92. The first actuator 92 is connected in a fixed manner to the protective cover 34. In the closed position of the protective cover 34, the first switching element 90 is activated by the first actuator 92. It is only then that the machine 10 to be safeguarded can be started.

Figure 12:
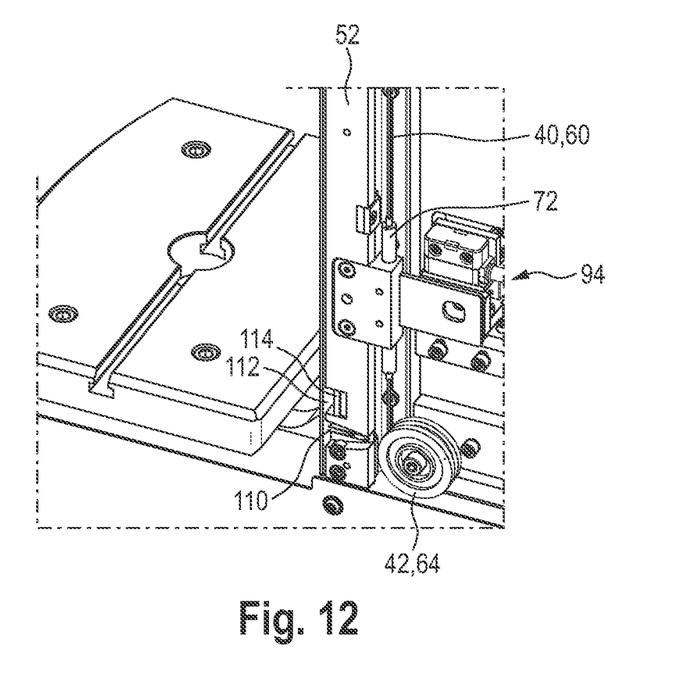
FIG. 12 shows a detail of a second locking device that can be used in the movable guard.
Figure 13:
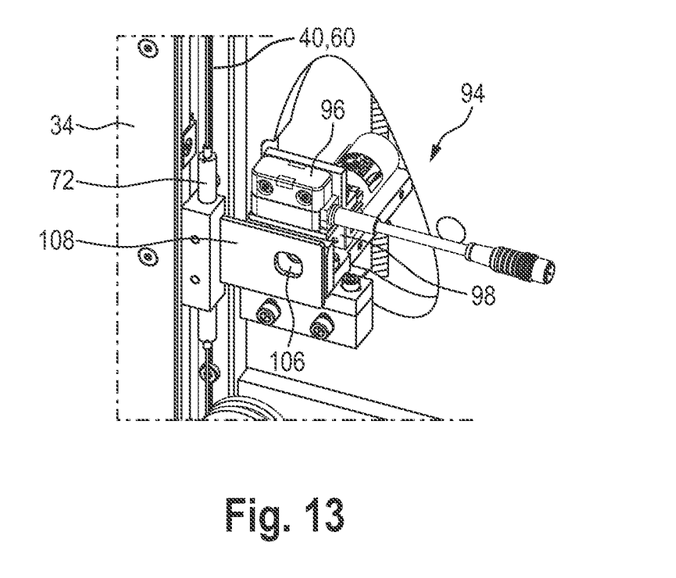
FIG. 13 shows another detail of the second locking device shown in FIG. 12.
Figure 14:
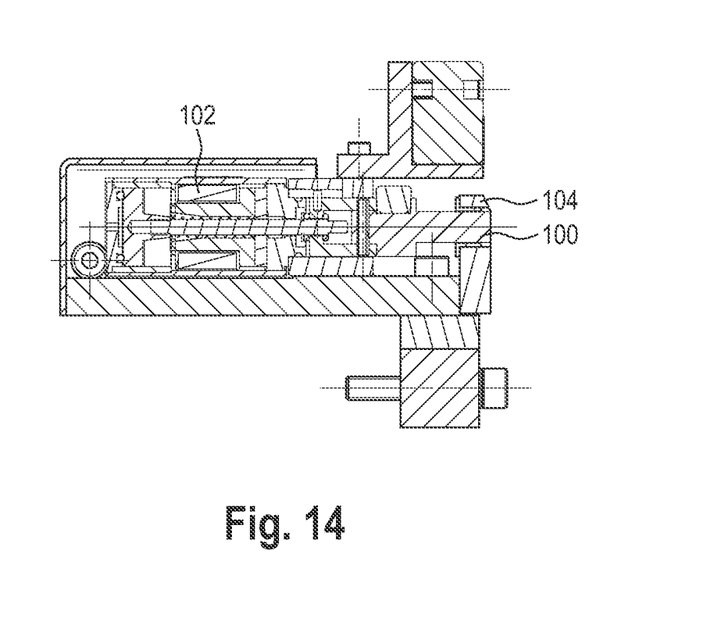
FIG. 14 shows a sectioned view of the second locking device shown in FIGS. 12 and 13.

A second safety switch 94 is arranged on the opposite side of the protective cover 34 (see FIGS. 12 and 13). This second safety switch 94 serves to hold the protective cover 34 shut during the operation of the machine 10 to be safeguarded. This second safety switch 94 also comprises a switching element 96 and an actuator 98, which, in the present case, are referred to as the second switching element 96 and the second actuator 98. The second safety switch 94 furthermore comprises a linear-motion plunger 100, which is visible particularly in the sectioned view in FIG. 14. The plunger 100 is moved with the aid of a bistable solenoid 102.

Guide bushes 104 guide the plunger 100 laterally in order to be able to absorb high lateral forces. When activated by the second actuator 98, the switching element 96 activates the solenoid 102 in order to extend the plunger 100. In the extended state, the plunger 100 projects into a hole 106 in a locking plate 108 (see FIG. 13). The locking plate 108 is connected in a fixed manner to the protective cover 34. The second actuator 98, which is preferably likewise based on RFID technology, detects the "plunger extended" position. If the plunger 100 is extended, the protective cover 34 can be moved upward by a maximum of 2 mm since the locking plate 108 is blocked by the plunger 100. During the operation of the machine 10 to be safeguarded, the protective cover 34 is thus held reliably shut. Only when the operation of the machine 10 to be safeguarded has been interrupted or is complete is the plunger 100 retracted again with the aid of the solenoid 102, thus releasing the protective cover 34 again and enabling it to be opened again by means of the linear motor 54.

The two safety switches 88, 94 are preferably connected to one another in a cascade circuit. This means that the solenoid 102 can only be activated when the first safety switch detects that the hood is closed.

Moreover, various features can be provided in order to improve the efficiency of the movable guard 30. For example, felt elements 114 can be installed in the sliding bearings 48 of the protective cover 34 (see FIG. 12). These felt elements 114 slide on the sliding surfaces of the linear guides 50. The felt elements 114 are impregnated with a lubricant and thus wet the sliding surfaces of the linear guides 50 with a lubricating film. Since the felt elements 114 have a large absorption capacity, a long-term lubricating reservoir is ensured.

In order to dissipate electrostatic charges, the protective cover 34 can be provided with an antistatic coating. Antistatic brushes 110 can furthermore be installed in the connecting strips 52 of the protective cover 34 (see FIG. 12). In order to dissipate electrostatic charges efficiently, a cladding plate 112 is arranged on the rear side of the working area 32. The cladding plate 112 can be made from stainless steel, for example. On the one hand, this cladding plate 112 has the task of avoiding access to the working area 32 from the rear. On the other hand, the cladding plate 112 serves as a sliding surface for the antistatic brushes 110, thus enabling the electrostatic charges to be discharged into the grounded frame of the machine 10 to be safeguarded.

In conclusion, attention may be drawn to the fact that various cladding elements of the guard 30 which in practice act as fixed guards and, as physical barriers, prevent access to the internal components of the guard 30 and of the machine to be safeguarded have been omitted in FIGS. 4-13. Potential danger points, to which the moving slider 58 of the linear motor 54, the moving cables 60, 62 and the deflection pulleys 64, 66 give rise, are thereby eliminated in an effective manner.

A removable cladding element or a door can be provided on the rear side of the guard 30 to allow maintenance work to be carried out on the abovementioned elements. The electric components (e.g. the switched-mode power supply, converter, optical coupler card etc.) both for controlling the linear motor 54 and for controlling the solenoid 102 are preferably also accommodated within the housing 46 of the guard 30.

In summary, therefore, it can be stated that effective work protection is achieved by means of the guard 30. The drive concept is of very energy-efficient and space-saving design.

Moreover, the drive is relatively quiet. Owing to the use of simple mechanical components, the guard 30 can be produced at relatively low cost.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A movable guard for safeguarding a machine, comprising:
   a protective cover which is configured to cover a working area of the machine;
   a counterweight;
   a connecting element which connects the protective cover to the counterweight,
   wherein the connecting element comprises a first cable, the ends of which are connected to each other, and a second cable, the ends of which are connected to each other, and wherein the first cable and the second cable are spaced apart, run parallel to each other and are each connected separately to the counterweight and the protective cover;
   a deflection element which is configured to deflect the connecting element in such a way that the protective cover and the counterweight are movable in mutually opposite directions, wherein the deflection element comprises two first deflection pulleys for deflecting the first cable and two second deflection pulleys for deflecting the second cable; and
   a drive which acts on the counterweight in order to drive the counterweight, wherein the drive engages on the counterweight at a force input point which is arranged at a same distance from the first and the second cable.

2. The movable guard as claimed in claim 1, wherein the first cable and the second cable are arranged at a same distance from a central plane which divides the protective cover into two halves of equal size.

3. The movable guard as claimed in claim 1, further comprising two mutually spaced linear guides which are arranged parallel to each other and in which the protective cover is guided.

4. The movable guard as claimed in claim 1, wherein the drive comprises a linear drive.

5. The movable guard as claimed in claim 4, wherein the linear drive comprises a linear motor with a Hall-effect sensor.

6. The movable guard as claimed in claim 1, wherein the protective cover comprises a transparent hood.

7. A press comprising the movable guard of claim 1.

8. The press as claimed in claim 7, further comprising a motor and a press ram which is driven by the motor.

9. The press as claimed in claim 8, wherein the motor is an electric motor.

10. The press as claimed in claim 8, wherein the motor is configured to drive the press ram in a translatory manner.

11. The press as claimed in claim 8, wherein protective cover covers at least a part of the press ram.

12. A movable guard for safeguarding a machine, comprising:
   a protective cover which is configured to cover a working area of the machine;
   a counterweight;
   a connecting element which connects the protective cover to the counterweight;
   a deflection element which is configured to deflect the connecting element in such a way that the protective cover and the counterweight are movable in mutually opposite directions; and
   a drive which acts on the counterweight in order to drive the counterweight, wherein the drive is connected to the counterweight by means of a magnetic coupling.

13. The movable guard as claimed in claim 12, wherein the connecting element comprises a cable, the ends of which are connected to each other, and wherein the deflection element comprises two deflection pulleys.

14. The movable guard as claimed in claim 12, wherein the magnetic coupling comprises a permanent magnet.

15. The movable guard as claimed in claim 14, wherein the permanent magnet is mounted in a floating manner.

16. A movable guard for safeguarding a machine, comprising:
   a protective cover which is configured to cover a working area of the machine;
   a counterweight;
   a connecting element which connects the protective cover to the counterweight;
   a deflection element which is configured to deflect the connecting element in such a way that the protective cover and the counterweight are movable in mutually opposite directions; and
   a drive which acts on the counterweight in order to drive the counterweight, wherein the drive comprises a linear drive, wherein the linear drive comprises a slider which is moved in translatory manner, and wherein the slider and the counterweight together have a total dead weight which differs by no more than 10% from a dead weight of the protective cover.

17. The movable guard as claimed in claim 16, wherein the connecting element comprises a cable, the ends of which are connected to each other, and wherein the deflection element comprises two deflection pulleys.

18. A movable guard for safeguarding a machine, comprising:
   a protective cover which is configured to cover a working area of the machine, wherein the protective cover has a substantially U-shaped cross section;
   a counterweight;
   a connecting element which connects the protective cover to the counterweight;
   a deflection element which is configured to deflect the connecting element in such a way that the protective cover and the counterweight are movable in mutually opposite directions; and a drive which acts on the counterweight in order to drive the counterweight.

19. The movable guard as claimed in claim 18, wherein the connecting element comprises a cable, the ends of which are connected to each other, and wherein the deflection element comprises two deflection pulleys.

\* \* \* \* \*